US012250504B2

(12) United States Patent
Hong et al.

(10) Patent No.: US 12,250,504 B2
(45) **Date of Patent: *Mar. 11, 2025**

(54) MULTI-FUNCTION ACOUSTIC SENSOR

(71) Applicant: SAMSUNG ELECTRONICS CO., LTD., Suwon-si (KR)

(72) Inventors: Hyeokki Hong, Suwon-si (KR); Hyunwook Kang, Daejeon (KR); Sungchan Kang, Hwaseong-si (KR); Cheheung Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,228

(22) Filed: Apr. 19, 2023

(65) Prior Publication Data

US 2023/0254612 A1 Aug. 10, 2023

Related U.S. Application Data

(63) Continuation of application No. 17/193,720, filed on Mar. 5, 2021, now Pat. No. 11,665,456.

(30) Foreign Application Priority Data

Sep. 25, 2020 (KR) ........................ 10-2020-0125088

(51) Int. Cl.
*H04R 1/02* (2006.01)
*H04R 5/027* (2006.01)

(52) U.S. Cl.
CPC ............... *H04R 1/02* (2013.01); *H04R 5/027* (2013.01)

(58) Field of Classification Search
CPC . H04R 1/02; H04R 5/027; H04R 1/04; H04R 1/406; H04R 2201/025;
(Continued)

(56) References Cited

U.S. PATENT DOCUMENTS 8,098,853 B2 1/2012 Tanaka et al.
8,989,422 B2 * 3/2015 Tanaka .................. H04R 19/04 381/175

(Continued)

FOREIGN PATENT DOCUMENTS

JP 5128919 B2 1/2013
JP 2016-25514 A 2/2016

(Continued)

*Primary Examiner* — Carolyn R Edwards
*Assistant Examiner* — Julie X Dang
(74) *Attorney, Agent, or Firm* — Sughrue Mion, PLLC

(57) ABSTRACT

A multi-function acoustic sensor may include a plate structure having a plurality of open spaces that are spaced apart from each other; a plurality of sensors provided on the plate structure, the plurality of sensors including a plurality of sensor elements respectively provided to overlap the plurality of open spaces; and a case having an inner space in which the plurality of sensors are provided, the case including: a first case surface on which the plurality of sensors are provided, the first case surface having at least one first hole, and a second case surface opposite to the first case surface, the second case surface having at least one second hole, wherein the at least one first hole and the at least one second hole form at least one path along which sound is transmitted and sensed through at least one of the plurality of open spaces of the plate structure.

19 Claims, 13 Drawing Sheets

(58) Field of Classification Search
CPC ......................... H04R 2201/003; H04R 19/04; H04R 19/005; H04R 2410/03; H04R 1/2823; H04R 17/02; B81B 7/0061; B81B 2201/0257; B81B 2207/07; B81B 2207/012; B81B 7/0048; B81B 7/02; B81B 7/0077; B81B 2201/10; B81B 2203/0163; H01L 2224/32225; H01L 2224/48091; H01L 2224/48227; H01L 2924/15192; B81C 2203/054
See application file for complete search history.

(56) References Cited

U.S. PATENT DOCUMENTS

| | | | | |
|---|---|---|---|---|
| 9,661,411 | B1 | 5/2017 | Han et al. | |
| 9,872,102 | B2 | 1/2018 | Yoo | |
| 10,419,841 | B2 | 9/2019 | Sibbald et al. | |
| 11,665,456 | B2 * | 5/2023 | Hong | H04R 1/04<br>381/150 |
| 2007/0047744 | A1 | 3/2007 | Harney et al. | |
| 2011/0048138 | A1 * | 3/2011 | Li | H04R 17/00<br>29/25.35 |
| 2012/0146163 | A1 * | 6/2012 | Ho | B81C 1/0023<br>257/416 |
| 2015/0043759 | A1 * | 2/2015 | Koji | H04R 19/005<br>381/175 |
| 2016/0345106 | A1 * | 11/2016 | Pahl | H04R 1/04 |
| 2017/0013355 | A1 * | 1/2017 | Kim | H04R 19/04 |
| 2017/0156002 | A1 | 6/2017 | Han et al. | |
| 2018/0273372 | A1 * | 9/2018 | Piechocinski | H04R 31/00 |
| 2020/0095117 | A1 * | 3/2020 | Kim | H04R 19/005 |
| 2020/0400489 | A1 | 12/2020 | Kang et al. | |

FOREIGN PATENT DOCUMENTS

| | | | |
|---|---|---|---|
| KR | 10-2012-0000312 | A | 1/2012 |
| KR | 10-1610145 | B1 | 4/2016 |
| KR | 10-2117325 | B1 | 6/2020 |

* cited by examiner

MULTI-FUNCTION ACOUSTIC SENSOR

CROSS-REFERENCE TO RELATED APPLICATION

This application is a continuation of U.S. application Ser. No. 17/193,720, filed on Mar. 5, 2021, which is based on and claims priority under 35 U.S.C. § 119 to Korean Patent Application No. 10-2020-0125088, filed on Sep. 25, 2020, in the Korean Intellectual Property Office, the disclosure of which is incorporated by reference herein in its entirety.

BACKGROUND

1. Field

Example embodiments of the present disclosure relate to a multi-function acoustic sensor, and, more particularly, to a multi-function acoustic sensor which may be used multi-functionally according to various acoustic standards.

2. Description of Related Art

Acoustic sensors, which detect acoustic signals by converting mechanical movements into electrical signals, are utilized in apparatuses such as electronic apparatuses including microphones such as, for example, home appliances, image display devices, virtual reality devices, augmented reality devices, artificial intelligent speakers, automobiles, and ships, and apparatuses that distinguish external sound from internal sound.

To eliminate vibration effects from the acoustic signals, a physical method such as damping is used to eliminate the vibration, or a method for adding vibration absorbing agents or a mechanical correcting method for providing structural characteristics robust against the vibration is used. In the case of the mechanical method, vibration absorbing materials, or the like, are used to autonomously reduce the vibration, and thus, the acoustic sensor occupies a large volume. Thus, it is difficult to use such an acoustic sensor in a small device or module.

In the case of correcting an acoustic signal after vibration is detected by a separate structure, although the volume of an acoustic sensor is relatively smaller than that in the case of the physical method for vibration, the volume of the acoustic sensor is still large. Also, in this case, since correction is made by taking the characteristics of the original structure according to the vibration into consideration after checking the vibration with the separate structure, the case of the acoustic sensor is significantly affected by a change in the manufacturing process and complex computational operations are performed for the correction of the acoustic sensor.

SUMMARY

One or more example embodiments provide a multi-function acoustic sensor which may be implemented in a single case and may be used multi-functionally according to acoustic standards.

Additional aspects will be set forth in part in the description which follows and, in part, will be apparent from the description, or may be learned by practice of the presented example embodiments of the present disclosure.

In accordance with an aspect of an example embodiment, there is provided a multi-function acoustic sensor including: a plurality of sensors provided on a plate structure having a plurality of open spaces apart from each other, the plurality of sensors including a plurality of sensor elements respectively provided to overlap the plurality of open spaces; and a case having an inner space in which the plurality of sensors are provided, the case including: a first case surface on which the plurality of sensors are provided, the first case surface having at least one first hole, and a second case surface opposite to the first case surface, the second case surface having at least one second hole, wherein the at least one first hole and the at least one second hole form at least one path along which sound is transmitted and sensed through at least one of the plurality of open spaces of the plate structure.

The plate structure may include a bottom plate having the plurality of open spaces; and a plurality of supports which respectively extend from the bottom plate in a direction crossing the plurality of open spaces, and the plurality of sensor elements of the plurality of sensors may be respectively provided on the plurality of supports.

The plate structure may be a monolithic body.

The plate structure may include a plurality of individual plate structures each having one of the open spaces and one of the supports.

The multi-function acoustic sensor may further include a partition wall which is provided in the inner space of the case and spatially separates at least one of the plurality of sensors from another one of the plurality of sensors.

The first case surface may have a plurality of first holes respectively provided at positions corresponding to the plurality of sensors, a number of the plurality of first holes may be n, and a number of at least one second hole may be n−1 or less, or a number of at least one second hole is n or greater, and the plurality of first holes and the at least one second hole may form a plurality of paths along which sound is transmitted through the plurality of open spaces of the plate structure so that at least two of the plurality of sensors operate as acoustic sensors.

The plurality of first holes and the at least one second hole may be provided so that at least two of the plurality of sensors operate as directional acoustic sensors.

The multi-function acoustic sensor may further include a circuit substrate provided on the first case surface, and the circuit substrate may have third holes provided at positions respectively corresponding to all of the plurality of first holes, or at positions corresponding to a portion of the plurality of first holes, so that at least one of the plurality of sensors operates as an omni-directional acoustic sensor or a vibration sensor.

The at least one first hole and the at least one second hole may be respectively provided at positions corresponding to the plurality of sensors, and the at least one first hole and the at least one second hole may form a plurality of paths along which sound is transmitted through at least two of the plurality of open spaces of the plate structure so that at least two of the plurality of sensors operate as acoustic sensors.

The partition wall may spatially separate the plurality of sensors from each other.

The multi-function acoustic sensor may further include a circuit substrate which is provided on the first case surface and has third holes respectively provided at positions corresponding to a plurality of first holes of the first case surface or at positions corresponding to less than all of the plurality of first holes.

The first case surface may have a plurality of first holes and the second case surface may have a plurality of second holes, the plurality of first holes and the plurality of second holes may form a plurality of paths along which sound is transmitted through at least two of the plurality of open spaces of the plate structure so that at least two of the plurality of sensors operate as acoustic sensors, either the plurality of first holes or the plurality of second holes may be provided in portions of the first case surface and the second case surface, respectively, corresponding to at least one sensor of the plurality of sensors, the at least one sensor may operate as an omni-directional acoustic sensor, and the multi-function acoustic sensor may include at least two directional acoustic sensors and at least one omni-directional acoustic sensor.

The multi-function acoustic sensor may further include a circuit substrate which is provided on the first case surface and has third holes respectively provided at positions corresponding to the plurality of first holes or at positions corresponding to less than all of the plurality of first holes.

The first case surface may have a plurality of first holes and the second case surface may have a plurality of second holes, the plurality of first holes and the plurality of second holes may form a plurality of paths along which sound is transmitted through at least two of the plurality of open spaces of the plate structure so that at least two of the plurality of sensors operate as acoustic sensors, and neither the first hole or second hole may be provided on portions of the first case surface and the second case surface corresponding to at least one sensor of the plurality of sensors so that at least one of the plurality of sensors may operate as a vibration sensor, and the multi-function acoustic sensor may include a plurality of directional acoustic sensors and at least one vibration sensor.

The multi-function acoustic sensor may further include a circuit substrate which is provided on the first case surface and has third holes respectively provided at positions corresponding to a portion of the plurality of first holes.

The first case surface may have a plurality of first holes, and the multi-function acoustic sensor further may include a circuit substrate which is provided on the first case surface and has third holes respectively provided at positions corresponding to the plurality of first holes or at positions corresponding to less than all of the plurality of first holes.

The partition wall may be provided to spatially separate the plurality of sensors from each other, the first case surface may have a plurality of first holes, the second case surface may have a plurality of second holes, the multi-function acoustic sensor further may include a circuit substrate which is provided on the first case surface and has a plurality of third holes respectively provided at positions corresponding to the plurality of first holes or at positons corresponding to less than all of the plurality of first holes, the plurality of first holes, the plurality of second holes, and the plurality of third holes may be provided so that at least one of the plurality of sensors operates as a directional acoustic sensor, and the plurality of first holes, the plurality of second holes, and the plurality of third holes may be provided such that at least one of the plurality of second holes does not correspond to a first hole, and at least one of the plurality of second holes does not correspond to a third hole, and one of the plurality of sensors may operate as an omni-directional acoustic sensor.

The first case surface may have a plurality of first holes, the plurality of first holes may be respectively provided at positions corresponding to the plurality of sensors, a number of the plurality of first holes may be n, and a number of the at least one second hole may be less than n, and the plurality of first holes and the at least one second hole may form the at least one path along which sound is transmitted through the at least one of the plurality of open spaces of the plate structure so that at least two of the plurality of sensors operate as acoustic sensors.

The multi-function acoustic sensor may further include a partition wall which is provided in the inner space of the case spatially separates at least one of the plurality of sensors from another sensor of the plurality of sensors.

A side wall of the case may have at least one atmospheric pressure adjusting hole which does not transmit sound pressure.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
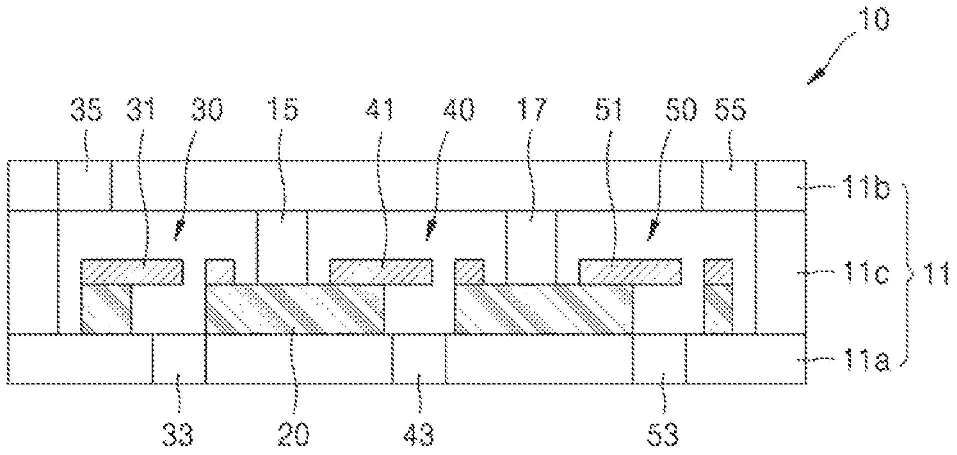
FIG. 1 schematically shows a multi-function acoustic sensor according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the present disclosure. As used herein, the term “and/or” includes any and all combinations of one or more of the associated listed items. Expressions such as “at least one of,” when preceding a list of elements, modify the entire list of elements and do not modify the individual elements of the list. For example, the expression, “at least one of a, b, and c,” should be understood as including only a, only b, only c, both a and b, both a and c, both b and c, or all of a, b, and c.

Hereinafter, example embodiments will be described in more detail with reference to the accompanying drawings. Like reference numbers refer to like elements in the figures, and the size of each component in the drawings may be exaggerated for clarity and convenience of description. The example embodiments described below are merely examples, and it is possible to make various changes to the example embodiments.

Hereinafter, when an element is referred to as being provided, disposed, and the like, “above,” “on,” “below,” “under,” “on an upper side of,” “on a lower side of,” “on a right side of,” “on a left side of,” and the like, another element, the element may directly contact the other element, or another element may be provided between the element and the other element. The singular forms of terms include the plural forms of the terms unless the context clearly indicates otherwise. Further, when it is described that one part “includes” some elements, it will be understood to imply the inclusion of the stated elements but not the exclusion of any other elements, unless explicitly described to the contrary. The use of the term “the,” and similar referents, when modifying a term is to be construed to cover both the singular and the plural forms of the modified term.

Figure 2:
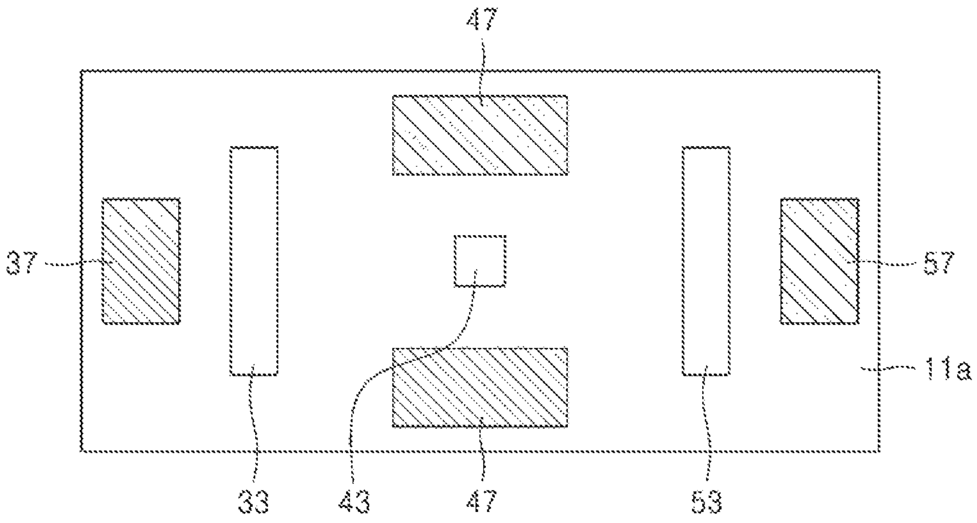
FIG. 2 is a plan view schematically illustrating a first case surface of a case of FIG. 1.

FIG. 1 schematically shows a multi-function acoustic sensor 10 according to an example embodiment. FIG. 2 is a plan view schematically illustrating a first case surface 11*a* of a case 11 of FIG. 1.

Referring to FIGS. 1 and 2, the multi-function acoustic sensor 10 according to an example embodiment may include a plurality of sensors 30, 40, and 50, and a case 11 having inner spaces for accommodating the plurality of sensors 30, 40, and 50. The plurality of sensors 30, 40, and 50 may be supported by a plate structure 20 having a plurality of open spaces that are spaced apart from each other, and may be respectively disposed on the plate structure to overlap the plurality of open spaces. The case 11 may include a first case surface 11*a* which has one or more first holes 33, 43, and 53 extending therethrough, and in which the plurality of sensors 30, 40, and 50 are installed; a second case surface 11*b* which has one or more second holes 35 and 55 extending therethrough, and is provided opposite to the first case surface 11*a*; and side walls 11*c* provided between the first case surface 11*a* and the second case surface 11*b*. The first case surface 11*a*, the second case surface 11*b*, and the side walls 11*c* may be a housing defining an inner space in which the plurality of sensors 30, 40, and 50 are provided. The one or more first holes 33, 43, and 53, and the one or more second holes 35 and 55 may be arranged to provide at least one path along which sound is transmitted and sensed through at least one of the open spaces of the plate structure 20.

FIG. 1 and the following example embodiment show that the first, second, and third sensors 30, 40, and 50 are provided in the inner space of the case 11, but this is merely an example. The number of sensors may be four or more, and the number of first holes 33, 43, and 53, the number of second holes 35 and 55, and a number of third holes 93*a*, 93*b*, and 93*c*, which are provided in a circuit substrate 90 described later, may change according to the number of sensors.

The plate structure 20 may include a bottom plate having a plurality of open spaces spaced apart from each other, and a plurality of supports which extend from the bottom plate in a direction crossing the open spaces. In other words, the plurality of supports may overlap the open spaces. Sensor elements 31, 41, and 51 may be respectively provided on the plurality of supports. For example, as illustrated in FIG. 16, the bottom plate may have a structure including a bottom plate 71, and a support 72 which is provided in an open space 71*a* of the bottom plate 71 and extends from the bottom plate 71 in a direction crossing the open space 71*a*.

Figure 15:
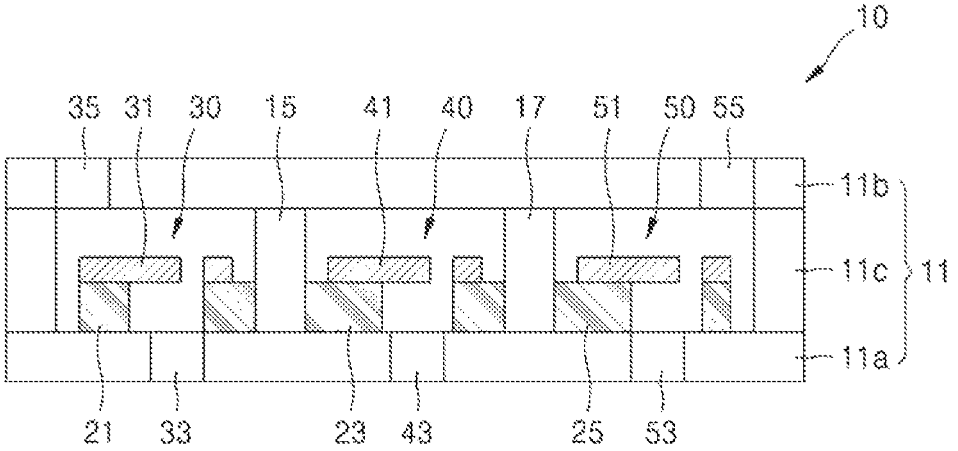

In the present example embodiment and following various example embodiments, the plate structure 20 may be formed as a single body, i.e., a monolithic body. That is, the bottom plate having the plurality of open spaces may be provided as a single body, and the supports may respectively extend from the bottom plate in the direction crossing the open spaces. In another example, instead of using the plate structure 20 formed as the single body, an array of a plurality of individual plate structures 21, 23, and 25, each of which has one open space and one support, is provided as illustrated in FIG. 15, and the sensor elements 31, 41, and 51 are positioned in supports of the individual plate structures 21, 23, and 25, respectively. Accordingly, a structure may be achieved in which the plurality of sensors 30, 40, and 50 are provided independently and are arranged in the inner spaces of the case 11.

Figure 16:
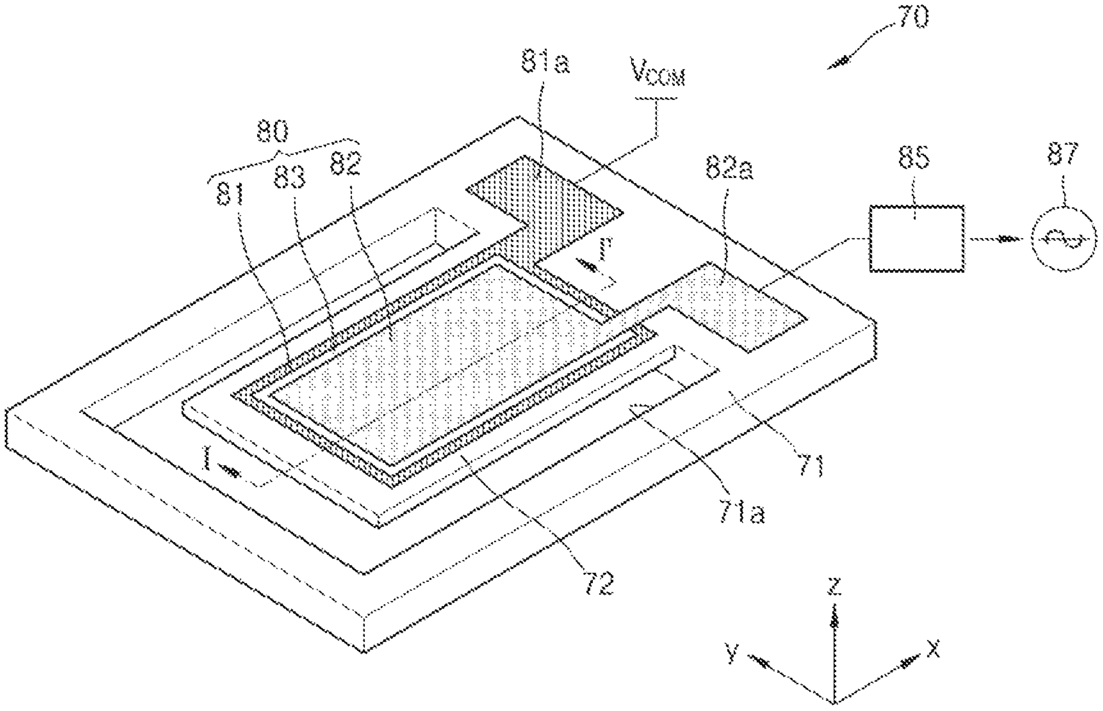
FIG. 16 is a perspective view illustrating an example of a sensor which may be utilized in multi-function acoustic sensors according to various example embodiments.
Figure 17:
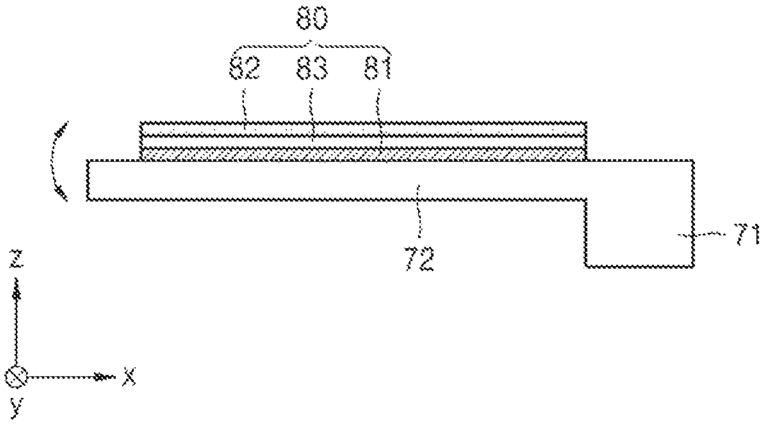
FIG. 17 is a cross-sectional view taken along line I-I' of FIG. 16.

For example, the plurality of sensors 30, 40, and 50 may be provided with a sensor 70 having a cantilever shape as illustrated in FIGS. 16 and 17. That is, the plurality of sensors 30, 40, and 50 may have a cantilever structure shape. Here, each of the plurality of sensors 30, 40, and 50 may be, for example, a pressure gradient micro-electromechanical system (MEMS) element and have its own directivity.

Although FIG. 16 shows only one sensor, the plurality of sensors 30, 40, and 50 may each have the structure shown in FIG. 16. The sensor elements 31, 41, and 51 of the plurality of sensors 30, 40, and 50 may be provided, for example, in a configuration as illustrated in FIGS. 16 and 17, or may have another configuration. This is merely an example, and embodiments are not limited thereto.

In the multi-function acoustic sensor 10 according to an example embodiment, when the number of the first holes 33, 43, and 53 provided in the first case surface 11*a* of the case 11 being n, the number of second holes 35 and 55 provided in the second case surface 11*b* of the case 11 may be less than n, equal to n, or greater than n. Also, the first holes 33, 43, and 53 and the second holes 35 and 55 may be provided to form a plurality of paths along which sound is transmitted through at least two of the open spaces of the plate structure 20 so that at least two of the plurality of sensors 30, 40, and 50 operate as acoustic sensors.

For example, if the first holes 33, 43, and 53 provided in the first case surface 11*a* of the case 11 are provided at positions corresponding to the plurality of sensors 30, 40, and 50, respectively, and the number of second holes 35 and 55 provided in the second case surface 11*b* of the case 11 is $n-1$, then at least two of the plurality of sensors 30, 40, and 50 may operate as acoustic sensors.

Here, the multi-function acoustic sensor 10 according to an example embodiment may further include partition walls 15 and 17 which spatially separate at least one of the plurality of sensors 30, 40, and 50 from the other sensors of the plurality of sensors 30, 40, and 50. For example, the partition walls 15 and 17 may be provided to spatially separate the plurality of sensors 30, 40, and 50 from each other.

In the multi-function acoustic sensor 10 as illustrated in FIGS. 1 and 2, the partition walls 15 and 17 may be provided to spatially separate the plurality of sensors 30, 40, and 50 from each other, the first holes 33, 43, and 53 provided in the first case surface 11*a* of the case 11 may be provided at positions corresponding to the plurality of sensors 30, 40, and 50, respectively, and the number of second holes 35 and 55 provided in the second case surface 11*b* of the case 11 may be n−1. Accordingly, at least two of the plurality of sensors 30, 40, and 50 may operate as directional acoustic sensors, and at least one sensor provided to correspond to only the first holes 33, 43, and 53 may operate as an omni-directional acoustic sensor.

In a case where the multi-function acoustic sensor 10 is configured such that, among the plurality of sensors 34, 40, and 50, for example, the first and third sensors 30 and 50 disposed on both sides among the first to third sensors 34, 40, and 50 are used as the directional acoustic sensors and the second sensor 40 disposed on the center is used as the omni-directional acoustic sensor, some of the first holes 33, 43, and 53 provided in the first case surface 11*a* may have an elongated slit shape. Also, pads 37, 47, and 57 for electrical connection with a printed circuit board (PCB) may be provided on the first case surface 11*a*.

FIGS. 1 and 2 and following various example embodiments illustrate that the plurality of sensors 30, 40, and 50 include the first, second, and third sensors 30, 40, and 50. However, this is merely an example, and the embodiments are not limited thereto. The embodiments may be variously changed according to the number of sensors and the multi-functional utilization of the sensors.

Here, the multi-function acoustic sensor 10 according to the example embodiment may further include a circuit substrate 90 on which the first case surface 11*a* of the case 11 is disposed as illustrated in FIGS. 3, 4, 5, 6, 7, and 8, and third holes 93*a*, 93*c*, and 93*b* may be provided in the circuit substrate 90 at positions corresponding to each of the plurality of first holes 33, 43, and 53, or at positions corresponding to less than all of the plurality of first holes 33, 43, and 53.

Figure 3:
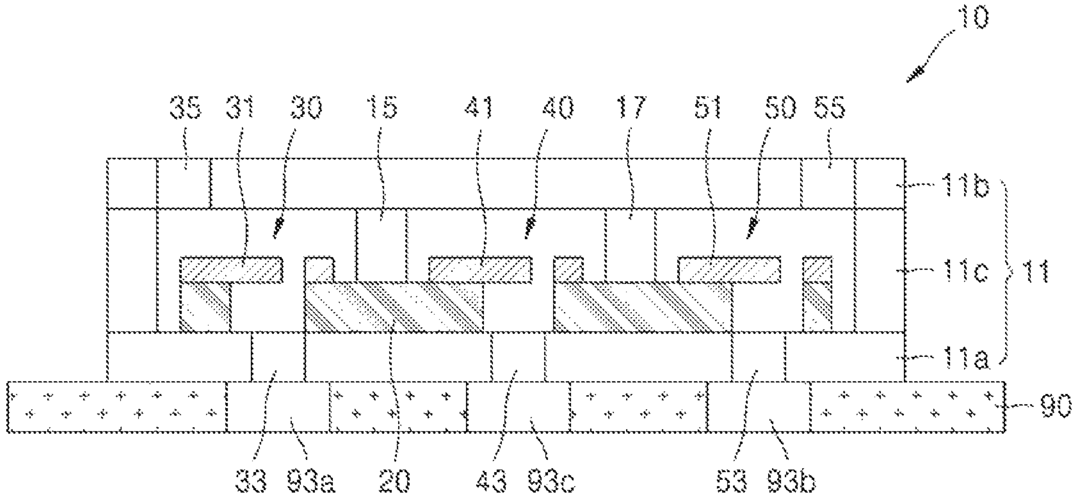
FIG. 3 schematically shows a multi-function acoustic sensor according to an example embodiment in which a circuit substrate having third holes formed at positions respectively corresponding to a plurality of first holes of a first case surface is further provided for the multi-function acoustic sensor of FIG. 1.
Figure 4:
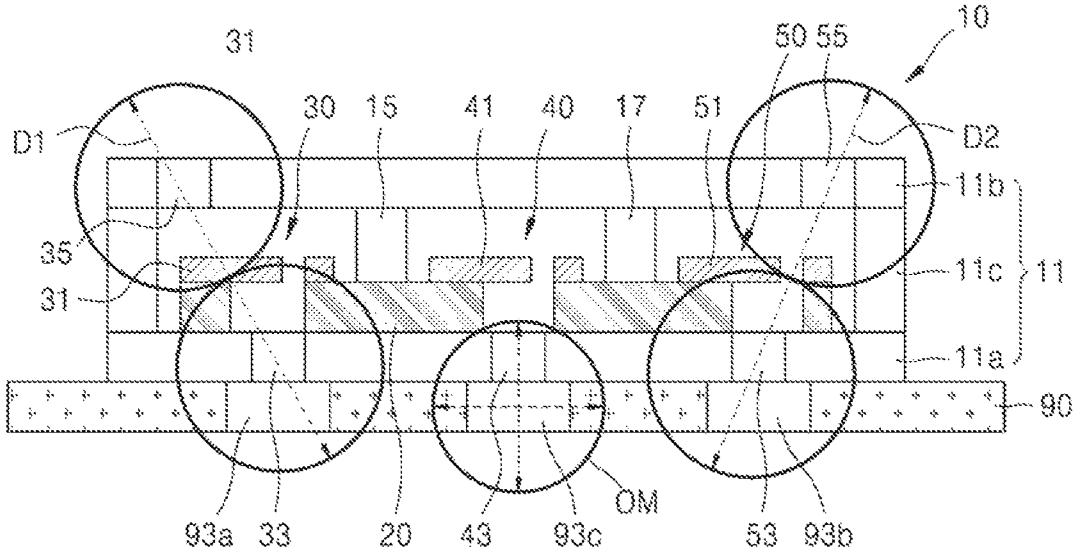
FIG. 4 illustrates an operation of the multi-function acoustic sensor FIG. 3.

FIG. 3 shows a multi-function acoustic sensor 10 according to an example embodiment in which a circuit substrate 90 having the third holes 93*a*, 93*c*, and 93*b* provided at the positions respectively corresponding to each of the plurality of first holes 33, 43, and 53 of the first case surface 11*a* is further provided for the multi-function acoustic sensor 10 of FIG. 1. FIG. 4 illustrates an operation of the multi-function acoustic sensor 10 of FIG. 3.

Referring to FIGS. 3 and 4, in a case where the circuit substrate 90 has the third holes 93*a*, 93*c*, and 93*b* at the positions corresponding to the plurality of first holes 33, 43, and 53 of the first case surface 11*a*, respectively, the first and third sensors 30 and 50 may operate as directional acoustic sensors (e.g., D1 and D2), and the second sensor 40 may operate as an omni-directional acoustic sensor (e.g., OM), as in FIG. 1 in which the circuit substrate 90 is not provided.

Figure 5:
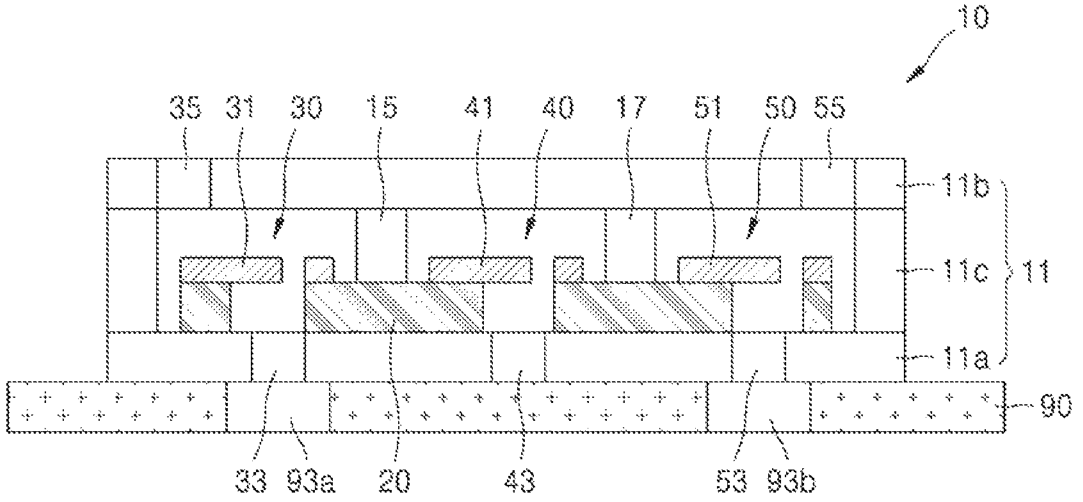
FIG. 5 schematically shows a multi-function acoustic sensor according to an example embodiment in which a circuit substrate having a third hole formed at a position except for at least one of a position corresponding to at least one of a plurality of first holes of a first case surface is further provided for the multi-function acoustic sensor of FIG. 1.
Figure 6:
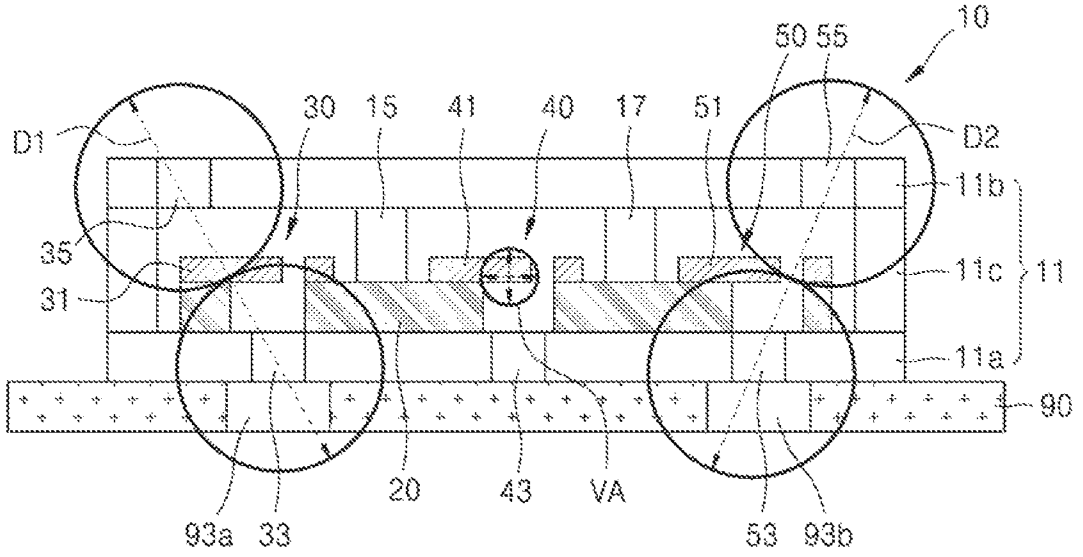
FIG. 6 illustrates an operation of the multi-function acoustic sensor FIG. 5.

FIG. 5 schematically shows a multi-function acoustic sensor 10 according to an example embodiment in which a circuit substrate 90 having third holes 93*a* and 93*b* respectively provided at positions corresponding to the first holes 33 and 53 of the first case surface 11*a* is further provided for the multi-function acoustic sensor 10 of FIG. 1. FIG. 6 illustrates an operation of the multi-function acoustic sensor 10 of FIG. 5.

FIG. 5 shows a case where the third holes 93*a* and 93*b* are provided at the positions corresponding to the first and third sensors 30 and 50, respectively, and a third hole is not provided at the position corresponding to the second sensor 40. In this case, as shown in FIG. 6, the first and third sensors 30 and 50 may operate as directional acoustic sensors (e.g., D1 and D2). Also, there is no hole through which the sound is transmitted from an external source to the second sensor 40, and thus, the second sensor 40 may operate as a vibration sensor (e.g., VA).

Figure 7:
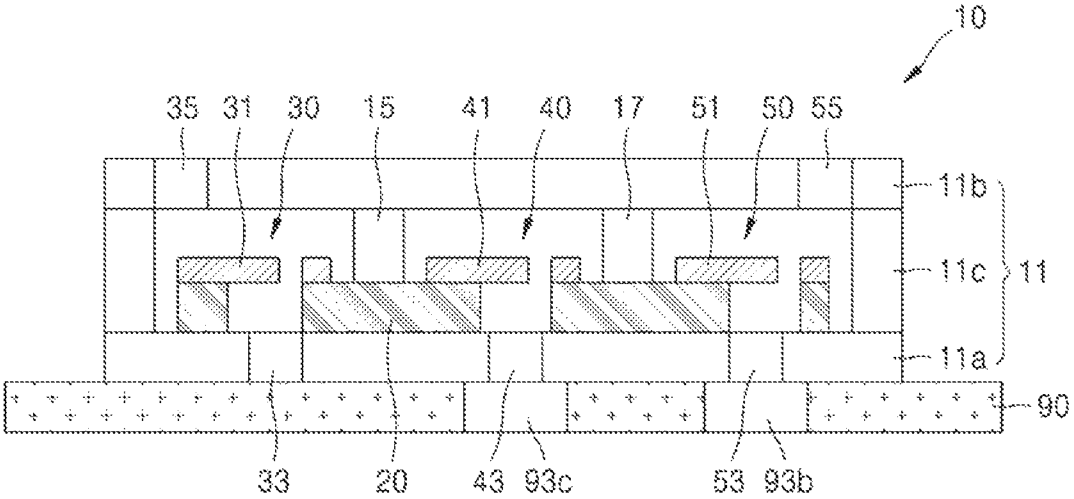
FIG. 7 schematically shows a multi-function acoustic sensor according to an example embodiment in which a circuit substrate having a third hole formed at a position except for at least one of a position corresponding to a plurality of first holes of a first case surface is further provided for the multi-function acoustic sensor of FIG. 1.
Figure 8:
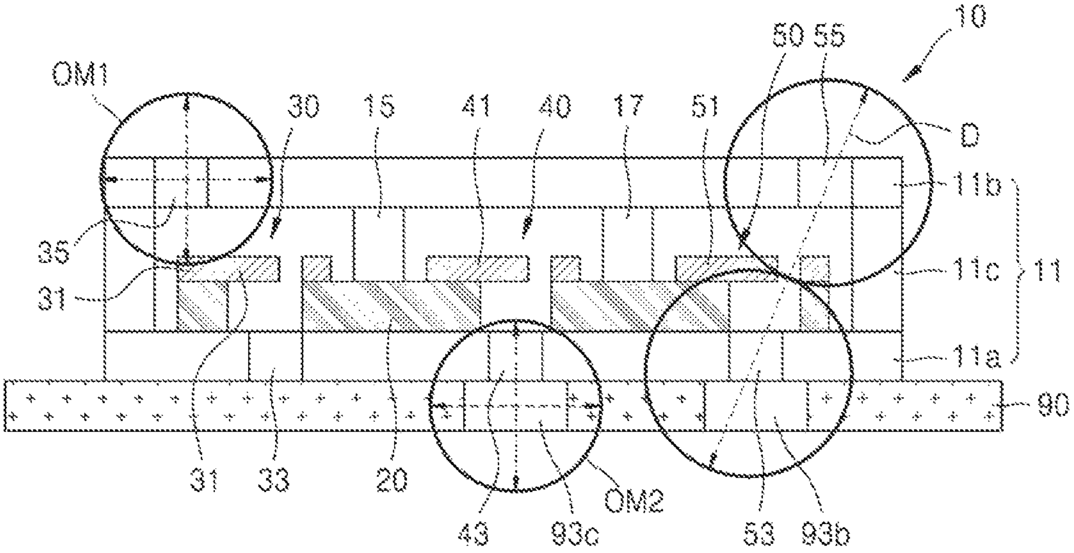
FIG. 8 illustrates an operation of the multi-function acoustic sensor FIG. 7.

FIG. 7 schematically shows a multi-function acoustic sensor according to an example embodiment in which a circuit substrate 90 having third holes 93*b* and 93*c* respectively provided at positions corresponding to the first holes 43 and 53 of the first case surface 11*a* is further provided for the multi-function acoustic sensor 10 of FIG. 1. FIG. 8 illustrates an operation of the multi-function acoustic sensor 10 of FIG. 7.

FIG. 7 shows a case where the third holes 93*c* and 93*b* are provided at the positions corresponding to the second and third sensors 40 and 50, respectively, and a third hole is not provided at the position corresponding to the first sensor 30. In this case, as shown in FIG. 8, sound may be transmitted through only the second hole 35 provided in the second case surface 11*b* in the first sensor 30, and sound may be transmitted through the third hole 93*c* of the circuit substrate 90 and the first hole 43 provided in the first case surface 11*a* in the second sensor 40. Thus, the first and second sensors 30 and 40 may operate as omni-directional acoustic sensors (e.g., OM1 and OM2). Also, the third sensor 50 may operate as a directional acoustic sensor (e.g., D).

As known from FIGS. 3 to 8, the sensor functions of the multi-function acoustic sensor 10 according to an example embodiment may be variously changed by adjusting the number and positions of third holes 93*a*, 93*b*, and 93*c* provided in the circuit substrate 90 on which the case 11 of the multi-function acoustic sensor 10 is disposed according to an example embodiment.

For example, as the number and positions of the third holes 93*a*, 93*b*, and 93*c* provided in the circuit substrate 90 are adjusted, the directional acoustic sensor may be changed to operate as the omni-directional acoustic sensor, and the omni-directional acoustic sensor may be changed to operate as the vibration sensor.

The changing of the sensor functions by the adjustment of the number and positions of the third holes 93*a*, 93*b*, and 93*c* provided in the circuit substrate 90 may also be applied to the multi-function acoustic sensor 10 of various example embodiments described with reference to the following FIGS. 9 to 15, and an example embodiment may be appropriately changed.

Figure 9:
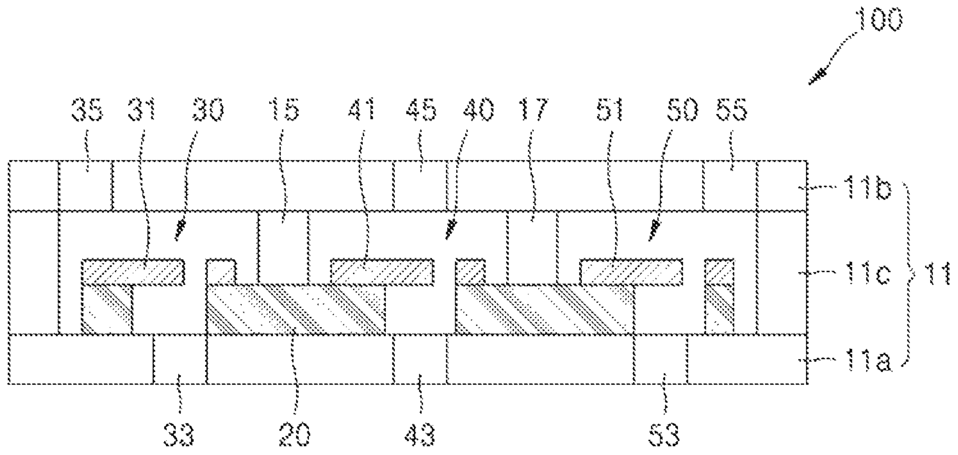
FIGS. 9, 10, 11, 12, 13, 14, and 15 schematically show multi-function acoustic sensors according to example embodiments.

FIG. 9 shows a multi-function acoustic sensor 100 according to another example embodiment. Compared to the multi-function acoustic sensor 10 of FIG. 1, the multi-function acoustic sensor 100 of FIG. 9 shows an example in which the first holes 33, 43, and 53 provided in a first case surface 11*a*, and second holes 35, 45, and 55 provided in a second case surface 11*b* are provided at positions corresponding to a plurality of sensors 30, 40, and 50, respectively. That is, the second hole 45 is further provided at the position of the second case surface 11*b* corresponding to the second sensor 40 among the first, second, and third sensors 30, 40, and 50. In this case, all of the first, second, and third sensors 30, 40, and 50 may operate as directional acoustic sensors. Also, as above described with reference to FIGS. 3 to 8, for the multi-function acoustic sensor 100 of FIG. 9, the circuit substrate 90 may be further provided, and the number and positions of the third holes 93*a*, 93*b*, and 93*c* provided in the circuit substrate 90 may be adjusted, and thus all of the first, second, and third sensors 30, 40, and 50 may operate as directional acoustic sensors, or at least one sensor may be changed to operate as an omni-directional acoustic sensor.

Figure 10:
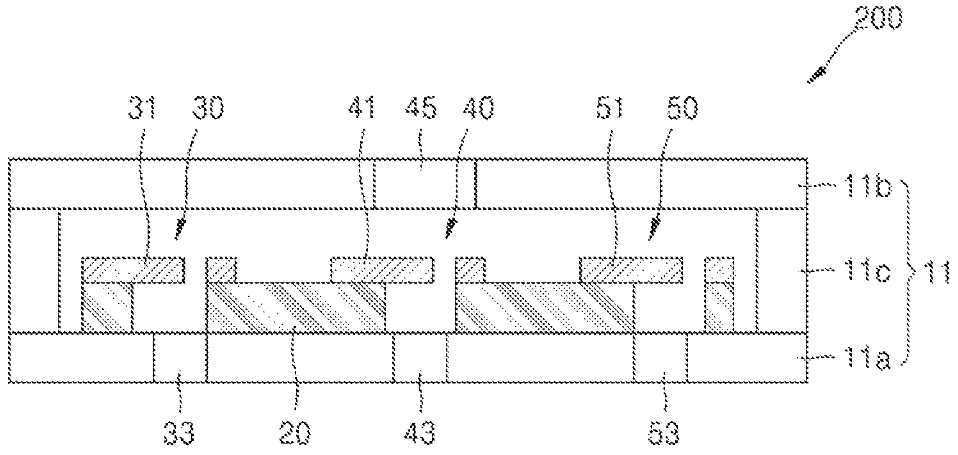

FIG. 10 shows a multi-function acoustic sensor 200 according to another example embodiment.

As illustrated in FIG. 10, first holes 33, 43, and 53 of a first case surface 11*a* may be provided at positions corresponding to a plurality of sensors 30, 40, and 50, respectively. Based on the number of first holes 33, 43, and 53 being n, the number of second holes of the second case surface 11*b* may be less than n. The first holes 33, 43, and 53 and the second holes may be provided to form paths along which sound is transmitted through the open spaces of a plate structure 20, so that at least two of the plurality of sensors 30, 40, and 50 may operate as acoustic sensors. Also, an example embodiment may not have partition walls 15 and 17 that spatially separate the plurality of sensors 30, 40, and 50.

Compared to the multi-function acoustic sensor 10 of FIG. 1, the multi-function acoustic sensor 200 of FIG. 10 shows an example in which the first holes 33, 43, and 53 provided in the first case surface 11*a* are provided at positions corresponding to the plurality of sensors 30, 40, and 50, respectively, and a second hole 45 provided in the second case surface 11*b* is provided at a position corresponding to only one of the plurality of sensors 30, 40, and 50, and a partition wall for spatially separating the plurality of sensors 30, 40, and 50 is not provided. For example, in a structure without a partition wall that spatially separates the first to third sensors 30, 40, and 50 as described above, the first holes 33, 43, and 53 of the first case surface 11*a* may be provided at the positions corresponding to the first to third sensors 30, 40, and 50, respectively, but the second hole 45 of the second case surface 11*b* may be provided at only the position corresponding to the second sensor 40. Because the multi-function acoustic sensor 10 of FIG. 10 does not include partition walls, the first holes 33, 43, and 53 and the single second hole 45 may form a plurality of paths along which sound is transmitted and sensed through each of the open spaces of the plate structure 20. In this case, all of the first to third sensors 30, 40, and 50 may operate as directional acoustic sensors.

Figure 11:
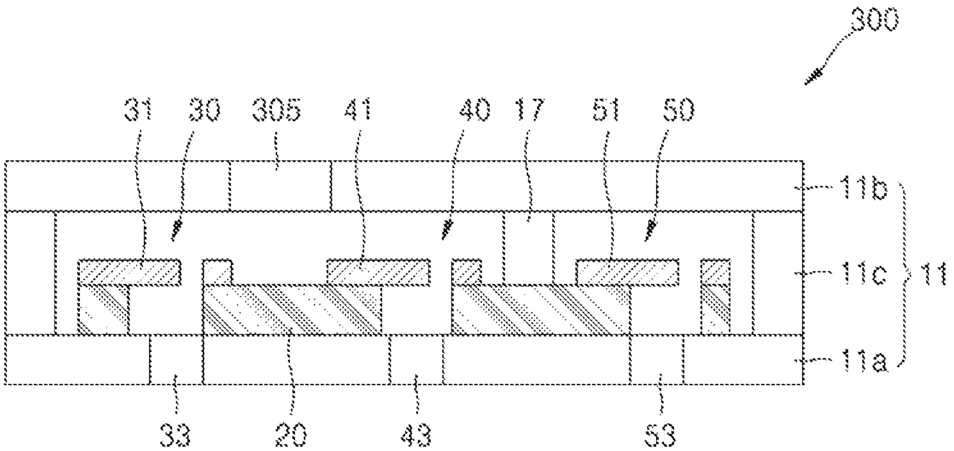

FIG. 11 shows a multi-function acoustic sensor 300 according to another example embodiment, and may be a modified example of FIG. 10.

As illustrated in FIG. 11, the multi-function acoustic sensor 300 includes a partition wall 17 for spatially separating first and second sensors 30 and 40 from a third sensor 50, first holes 33, 43, and 53 of a first case surface 11*a* provided at positions corresponding to the first to third sensors 30, 40, and 50, respectively, and a second hole 305 of a second case surface 11*b* provided to correspond to a side of the partition wall 17 in which the first and second sensors 30 and 40 are positioned. In this case, the first and second sensors 30 and 40 may operate as directional acoustic sensors, and the third sensor 50 may operate as an omni-directional acoustic sensor.

Also, in a case where a circuit substrate 90 is provided on a case 11 of the multi-function acoustic sensor 300 of FIG. 11, when third holes 93*a* and 93*c* are provided in the circuit substrate 90 at only positions corresponding to the first and second sensors 30 and 40 and are not provided at position corresponding to the third sensor 50, the third sensor 50 may operate as a vibration sensor.

In the structure in which the first holes 33, 43, and 53 provided in the first case surface 11*a* are provided at the positions corresponding to the plurality of sensors 30, 40, and 50, respectively, as illustrated in FIGS. 10 and 11, the number of sensors, which operate as the directional acoustic sensors among the plurality of sensors 30, 40, and 50, may be adjusted according to the number and positions of the second hole provided in the second case surface 11*b*, whether or not the partition wall is provided, and the number of partition walls. The remaining sensors may be adjusted to operate as omni-directional acoustic sensors or vibration sensors by providing the circuit substrate 90 below the first case surface 11*a*.

Figure 12:
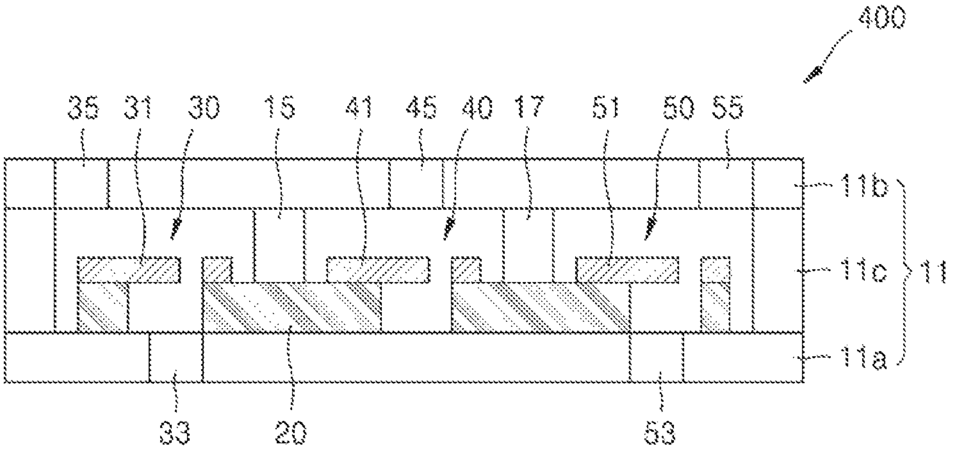

FIG. 12 shows a multi-function acoustic sensor 400 according to another example embodiment. Compared to the multi-function acoustic sensor 10 of FIG. 1, the multi-function acoustic sensor 400 of FIG. 12 shows an example in which the second holes 35, 45, and 55 provided in a second case surface 11*b* are provided at positions corresponding to a plurality of sensors 30, 40, and 50, respectively, but first holes 33 and 53 provided in a first case surface 11*a* are provided at only positions corresponding to some of the plurality of sensors 30, 40, and 50. For example, with respect to the first to third sensors 30, 40, and 50 as illustrated in FIG. 12, the first holes 33 and 53 may be provided at only positions corresponding to the first and third sensors 30 and 50, and may not be provided at a position corresponding to the second sensor 40. In this case, the first and third sensors 30 and 50 may operate as directional acoustic sensors, and the second sensor 40 may operate as an omni-directional acoustic sensor. For the multi-function acoustic sensor 400 of FIG. 12, a circuit substrate 90 may be further provided, and the number and positions of third holes 93*a*, 93*b*, and 93*c* provided in the circuit substrate 90 may be adjusted, and thus at least one of the first and third sensors operating as the directional acoustic sensor may be changed to operate as an omni-directional acoustic sensor.

Figure 13:
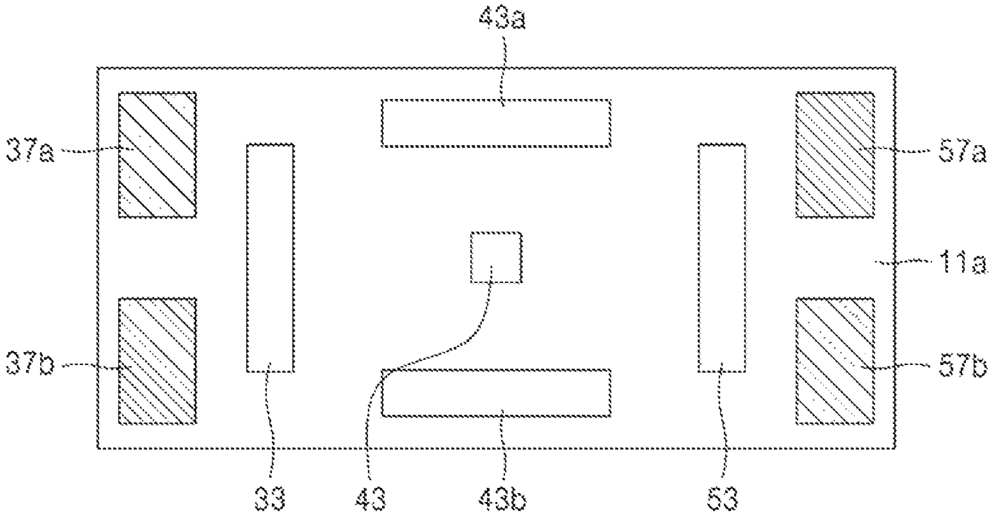

Here, the multi-function acoustic sensors 10, 100, 200, 300, and 400 according to the various example embodiments described above may have three or more directional acoustic sensors, and in this case, the first holes 33, 43, and 53 and pads provided in the first case surface 11*a* may be modified as illustrated in FIG. 13. That is, a plurality of first holes 33, 43*a*, 43*b*, and 53 provided in the first case surface 11*a* may have an elongated slit shape, and an arrangement of pads 37*a*, 37*b*, 57*a*, and 57*b* for electrical connection may also be variously changed. According to the multi-function acoustic sensors 10, 100, 200, 300, and 400 of various example embodiments utilizing the configuration shown in FIG. 13, a spatial acoustic sensor such as, for example, a 180 degree sensor or 360 degree sensor may be implemented by a combination of a plurality of directional acoustic sensors and at least one omni-directional acoustic sensor.

Figure 14:
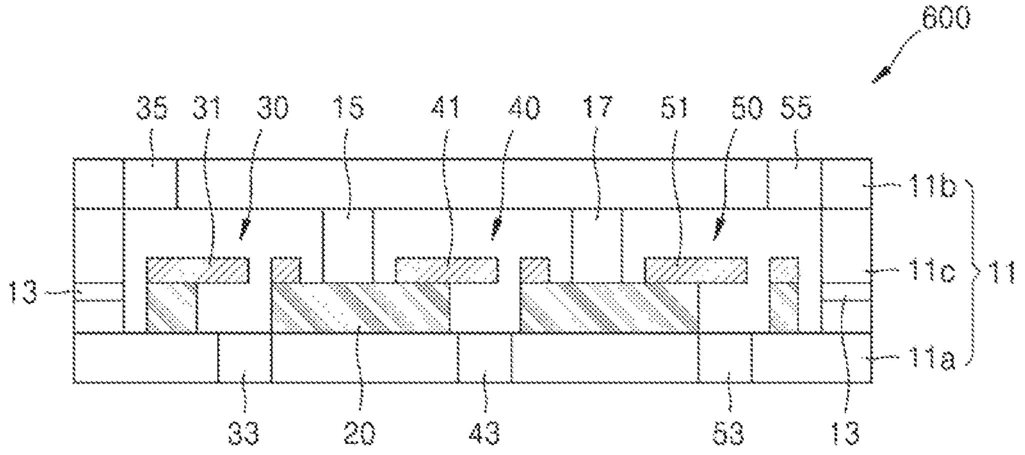

FIG. 14 shows a multi-function acoustic sensor 600 according to another example embodiment. Compared to the multi-function acoustic sensor 10 of FIG. 1, the multi-function acoustic sensor 600 of FIG. 14 shows an example in which at least one atmospheric pressure adjusting hole 13, which does not transmit sound pressure, is provided in a side wall 11*c* of a case 11. At least one atmospheric pressure adjusting hole 13 may be provided in the side wall 11*c* of the case 11. Based on the atmospheric pressure adjusting hole 13 being provided, the possibility of damage to cantilever portions of at least some of the plurality of sensors 30, 40, and 50 may be reduced when sound is suddenly transmitted. The atmospheric pressure adjusting hole 13 may be provided in the side wall 11*c* of the case 11 for at least some or all of the plurality of sensors 30, 40, and 50. This atmospheric pressure adjusting hole 13 may be used in the multi-function acoustic sensors 100, 200, 300, and 400 of the various example embodiments described above.

Here, the case where the circuit substrate 90 is provided on the first case surface 11*a* of the case 11 has been described and illustrated as an example, but the circuit substrate 90 may be provided on two or more surfaces of the case 11. Also, the sensing functions of the multi-function acoustic sensors 10, 100, 200, 300, 400, and 600 according to example embodiments may be adjusted according to the number and positions of the third holes provided in the circuit substrate 90.

Also, in the case where at least one of the plurality of sensors 30, 40, and 50 is configured to operate as a vibration sensor in the multi-function acoustic sensors 10, 100, 200, 300, and 400 according to example embodiments, a logic circuit for the vibration sensor may be further provided. The logic circuit for the vibration sensor may be provided in the inner space of the case 11, provided on the circuit substrate 90, or the like.

FIG. 16 is a perspective view illustrating an example of a sensor 70 which may be utilized in the multi-function acoustic sensors 10, 100, 200, 300, 400, and 600 according to various example embodiments. FIG. 17 is a cross-sectional view taken along line I-I' of FIG. 16.

Referring to FIGS. 16 and 17, the sensor 70 may include a sensor element 80 provided in a bottom plate 71 of a plate structure. An open space 71*a* may be formed in the bottom plate 71, and a support 72 extends from the bottom plate 71 toward the open space 71*a*. Here, one end of the support 72 is fixed to the bottom plate 71, and the other end of the support 72 may be configured to move in an up and down direction (e.g., in a z-axis direction). For example, a silicone bottom plate may be used as the bottom plate 71, but the example embodiment is not limited thereto. In addition, a bottom plate made of various materials may be used.

The sensor element 80 is provided on the support 72. In particular, the sensor element 80 may include a first electrode 81 provided on one surface of the support 72, a piezoelectric layer 83 provided on the first electrode 81, and a second electrode 82 provided on the piezoelectric layer 83. First and second terminals 81*a* and 82*a* electrically connected to the first and second electrodes 81 and 82 may be provided in the bottom plate 71.

When external energy such as sound and pressure is input to the sensor element 80, the piezoelectric layer 83 is deformed, and electric energy may be generated. For example, when sound generated from a sound source (S) is input to the sensor element 80, the piezoelectric layer 83 is deformed, electric energy may be generated between the first and second electrodes 81 and 82, and the electric energy may be output through the first and second terminals 81*a* and 82*a*. Here, for example, when common voltage $V_{com}$ is applied to the first terminal 81*a*, an output signal 87 may be obtained through a readout circuit 85 connected to the second terminal 82*a*.

The sensor 70 illustrated in FIG. 16 is a sensor having a cantilever structure shape, and may have different output gains according to an input direction of external energy. That is, the sensor 70 may operate as a directional acoustic sensor having sensitives varying depending on the input direction of external energy. Also, the sensor may operate as an omni-directional acoustic sensor, or a vibration sensor.

The multi-function acoustic sensors 10, 100, 200, 300, 400, and 600 according to the various example embodiments described above include three or more sensors having a cantilever structure shape and single case, and each of the sensors may be, for example, a pressure gradient MEMS element and may have directivity. Also, even when a MEMS device having a cantilever structure shape is provided as a sensor, each of the sensors may be changed into omni-directional acoustic sensors, directional acoustic sensors, or vibration sensors according to the type or number of three or more sound transmission trough-holes provided in the case and the circuit substrate.

The multi-function acoustic sensors 10, 100, 200, 300, 400, and 600 according to the example embodiments described above may be utilized in all fields related to acoustic devices. The multi-function acoustic sensors 10, 100, 200, 300, 400, and 600 may easily detect internal and external sound, be easily changed into omni-directional or directional microphones or vibration sensors in terms of functionality, correct the vibration, and easily remove the sound, and thus, may be usefully applied in various devices such as a television, a mobile device, an automobile, and a manufacturing device. Also, the increasing need for multi-functional acoustic sensors may be actively handled.

FIGS. 18 to 23 show various examples of electronic devices in which the multi-function acoustic sensors 10, 100, 200, 300, 400, and 600 according to various example embodiments may be applied.

Figure 18:
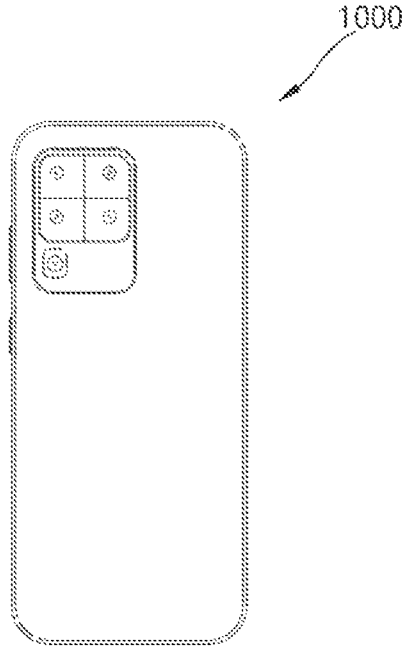
FIGS. 18, 19, 20, 21, 22, and 23 show various examples of electronic devices including multi-function acoustic sensors according to various example embodiments.
Figure 19:
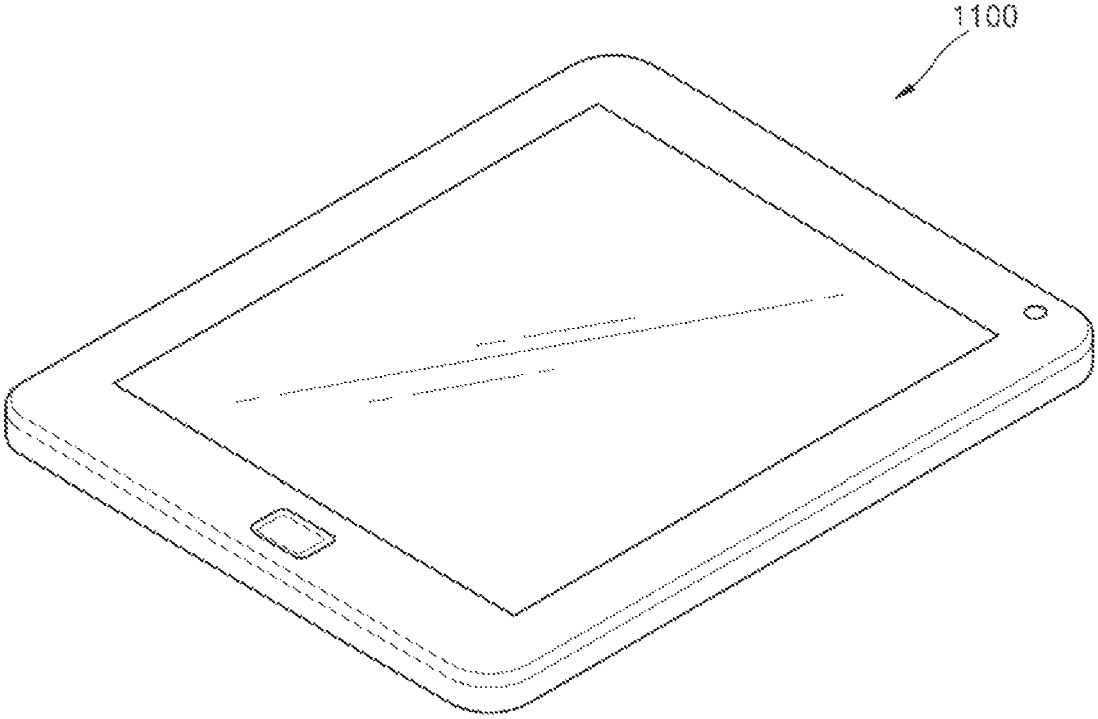
Figure 20:
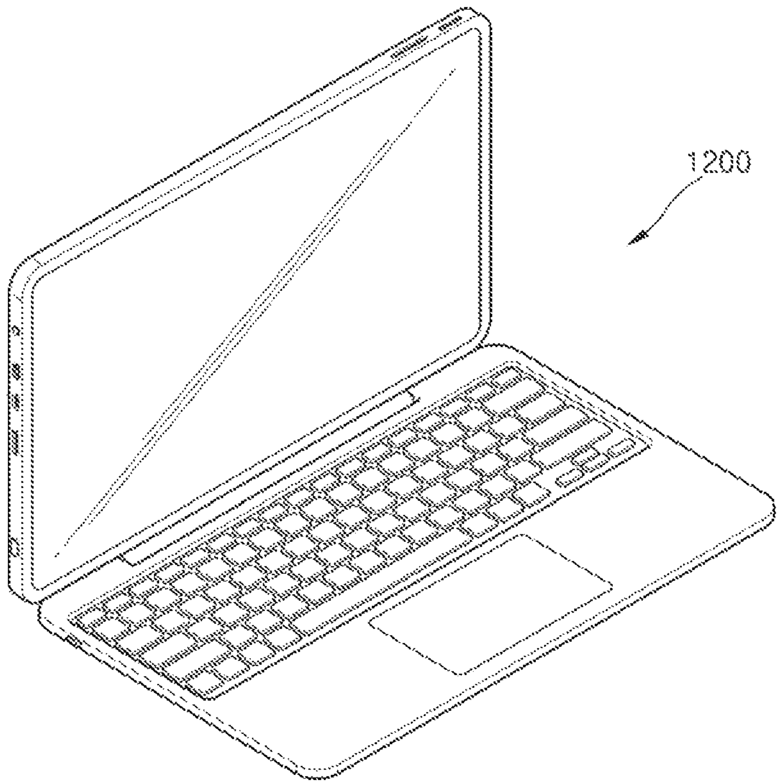
Figure 21:
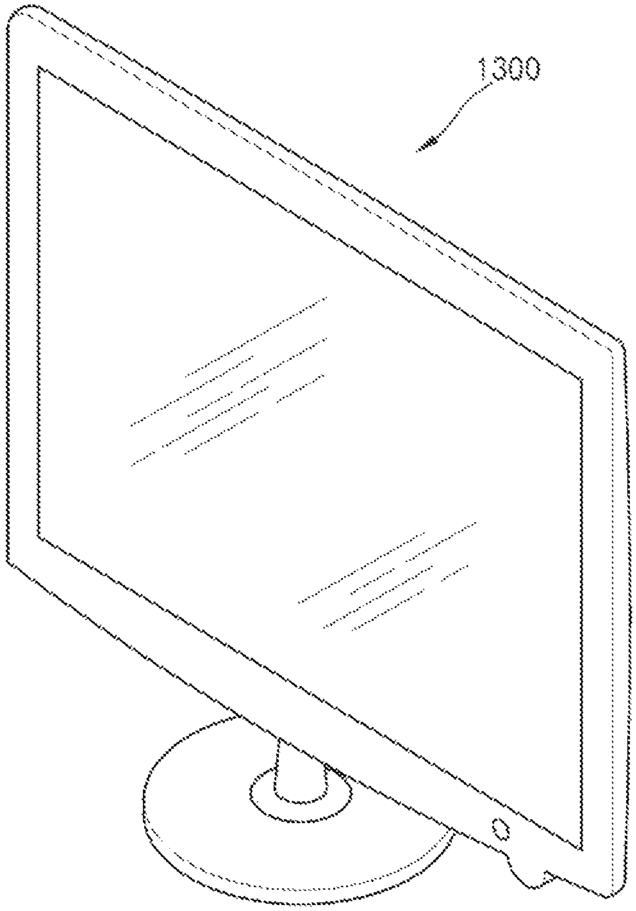
Figure 22:
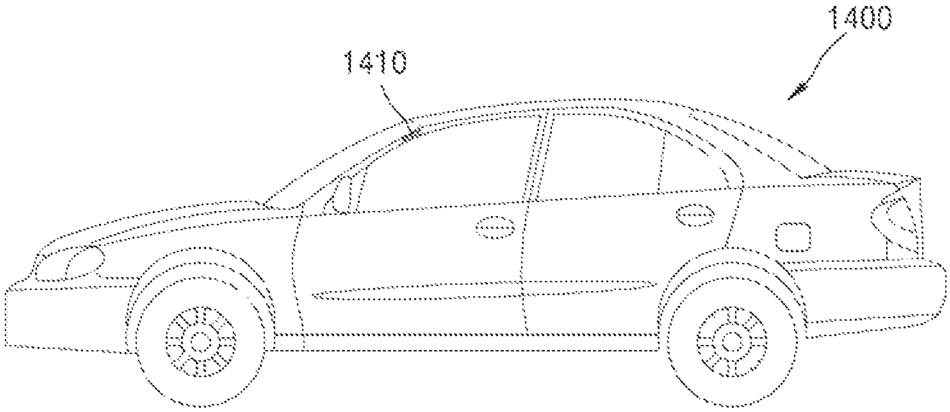
Figure 23:
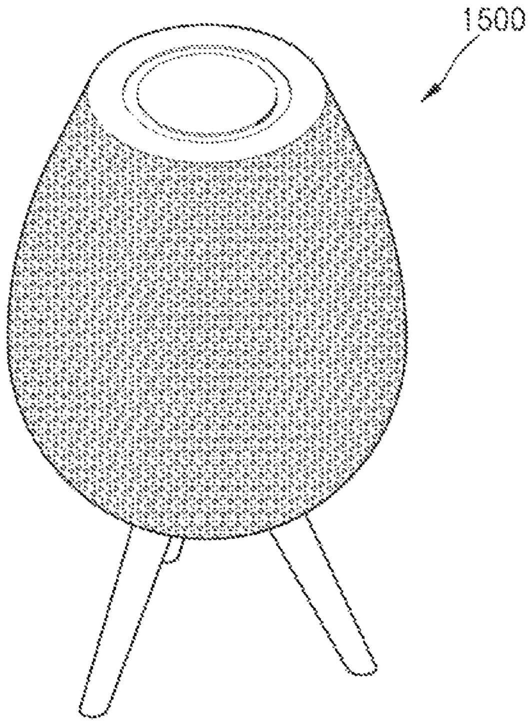

The multi-function acoustic sensors 10, 100, 200, 300, 400, and 600 according to the example embodiments may be applied to various electronic devices such as a mobile phone or smart phone 1000 illustrated in FIG. 18, a tablet or smart tablet 1100 illustrated in FIG. 19, a notebook computer 1200 illustrated in FIG. 20, a television or smart television 1300 illustrated in FIG. 21, an internal microphone 1410 of a highly-vibrating automobile 1400 illustrated in FIG. 22, and an artificial intelligent speaker 1500 illustrated in FIG. 23.

According to the multi-function acoustic sensor of the example embodiment, the plurality of sensors may be used multi-functionally according to the acoustic standards, and without separately manufacturing cases for relevant functions, the functions may be obtained by the single case.

The sensor functions of the multi-function acoustic sensor according to the example embodiment may be variously changed by adjusting the number and positions of holes provided in the circuit substrate provided on the case of the multi-function acoustic sensor according to the example embodiment.

It should be understood that the example embodiments described herein should be considered in a descriptive sense only and not for purposes of limitation. Descriptions of features or aspects within each example embodiment should typically be considered as available for other similar features or aspects in other example embodiments. While example embodiments have been described with reference to the figures, it will be understood by those of ordinary skill in the art that various changes in form and details may be made therein without departing from the spirit and scope as defined by the following claims.

What is claimed is:

1. An electronic device comprising:

a multi-function acoustic sensor, wherein the multi-function acoustic sensor comprising:

a plurality of sensors provided on a plate structure having a plurality of open spaces apart from each other, the plurality of sensors comprising a plurality of sensor elements respectively provided to overlap the plurality of open spaces; and a case having an inner space in which the plurality of sensors are provided, the case comprising:

a first case surface on which the plurality of sensors are provided, the first case surface having at least one first hole, and a second case surface opposite to the first case surface, the second case surface having at least one second hole, wherein the at least one first hole and the at least one second hole form at least one path along which sound is transmitted and sensed through at least one of the plurality of open spaces of the plate structure, wherein the first case surface has a plurality of first holes, wherein the plurality of first holes are formed as through holes from an exterior surface to an interior surface of the first case surface and are respectively provided at positions corresponding to the plurality of sensors; wherein the multi-function acoustic sensor further comprises a partition wall which is provided in the inner space of the case and spatially separates at least one of the plurality of sensors from another one of the plurality of sensors, wherein each of the plurality of sensors is formed over a corresponding one of the plurality of open spaces, and wherein each of the plurality of sensors extends over the corresponding open space such that the sensor does not entirely cross the open space to leave a single gap oriented in the same direction as the at least one first hole and the at least one second hole, and the sensor is asymmetric over the open space.

2. The electronic device of claim 1, wherein the plate structure comprises:

a bottom plate having the plurality of open spaces; and a plurality of supports which respectively extend from the bottom plate in a direction crossing the plurality of open spaces, and wherein the plurality of sensor elements of the plurality of sensors are respectively provided on the plurality of supports.

3. The electronic device of claim 2, wherein the plate structure is a monolithic body.

4. The electronic device of claim 2, wherein the plate structure comprises a plurality of individual plate structures each having one of the open spaces and one of the supports.

5. The electronic device of claim 1, wherein a number of the plurality of first holes is n, and a number of at least one second hole is n−1 or less, or a number of at least one second hole is n or greater, and wherein the plurality of first holes and the at least one second hole form a plurality of paths along which sound is transmitted through the plurality of open spaces of the plate structure so that at least two of the plurality of sensors operate as acoustic sensors.

6. The electronic device of claim 5, wherein the plurality of first holes and the at least one second hole are provided so that at least two of the plurality of sensors operate as directional acoustic sensors.

7. The electronic device of claim 6, wherein the multi-function acoustic sensor further comprises a circuit substrate provided on the first case surface, wherein the circuit substrate has third holes provided at positions respectively corresponding to all of the plurality of first holes, or at positions corresponding to a portion of the plurality of first holes, so that at least one of the plurality of sensors operates as an omni-directional acoustic sensor or a vibration sensor.

8. The electronic device of claim 1, wherein the at least one first hole and the at least one second hole are respectively provided at positions corresponding to the plurality of sensors, and wherein the at least one first hole and the at least one second hole form a plurality of paths along which sound is transmitted through at least two of the plurality of open spaces of the plate structure so that at least two of the plurality of sensors operate as acoustic sensors.

9. The electronic device of claim 1, wherein the partition wall spatially separates the plurality of sensors from each other.

10. The electronic device of claim 9, wherein the multi-function acoustic sensor further comprises a circuit substrate which is provided on the first case surface and has third holes respectively provided at positions corresponding to a plurality of first holes of the first case surface or at positions corresponding to less than all of the plurality of first holes.

11. The electronic device of claim 9, wherein the second case surface has a plurality of second holes, wherein the plurality of first holes and the plurality of second holes form a plurality of paths along which sound is transmitted through at least two of the plurality of open spaces of the plate structure so that at least two of the plurality of sensors operate as acoustic sensors, wherein either the plurality of first holes or the plurality of second holes are provided in portions of the first case surface and the second case surface, respectively, corresponding to at least one sensor of the plurality of sensors, wherein the at least one sensor operates as an omni-directional acoustic sensor, and wherein the multi-function acoustic sensor comprises at least two directional acoustic sensors and at least one omni-directional acoustic sensor.

12. The electronic device of claim 11, wherein the multi-function acoustic sensor further comprises a circuit substrate which is provided on the first case surface and has third holes respectively provided at positions corresponding to the plurality of first holes or at positions corresponding to less than all of the plurality of first holes.

13. The electronic device of claim 12, wherein the second case surface has a plurality of second holes, wherein the plurality of first holes and the plurality of second holes form a plurality of paths along which sound is transmitted through at least two of the plurality of open spaces of the plate structure so that at least two of the plurality of sensors operate as acoustic sensors, and neither the first hole or the second hole is provided on portions of the first case surface and the second case surface corresponding to at least one sensor of the plurality of sensors so that at least one of the plurality of sensors operates as a vibration sensor, and wherein the multi-function acoustic sensor comprises a plurality of directional acoustic sensors and at least one vibration sensor.

14. The electronic device of claim 13, wherein the multi-function acoustic sensor further comprises a circuit substrate which is provided on the first case surface and has third holes respectively provided at positions corresponding to a portion of the plurality of first holes.

15. The electronic device of claim 1, wherein the multi-function acoustic sensor further comprises a circuit substrate which is provided on the first case surface and has third holes respectively provided at positions corresponding to the plurality of first holes or at positions corresponding to less than all of the plurality of first holes.

16. The electronic device of claim 1, wherein the partition wall is provided to spatially separate the plurality of sensors from each other, wherein the second case surface has a plurality of second holes, wherein the multi-function acoustic sensor further comprises a circuit substrate which is provided on the first case surface and has a plurality of third holes respectively provided at positions corresponding to the plurality of first holes or at positons corresponding to less than all of the plurality of first holes, wherein the plurality of first holes, the plurality of second holes, and the plurality of third holes are provided so that at least one of the plurality of sensors operates as a directional acoustic sensor, wherein the plurality of first holes, the plurality of second holes, and the plurality of third holes are provided such that at least one of the plurality of second holes does not correspond to a first hole, and at least one of the plurality of second holes does not correspond to a third hole, and wherein one of the plurality of sensors operates as an omni-directional acoustic sensor.

17. The electronic device of claim 1, wherein a number of the plurality of first holes is n, and a number of the at least one second hole is less than n, and wherein the plurality of first holes and the at least one second hole form the at least one path along which sound is transmitted through the at least one of the plurality of open spaces of the plate structure so that at least two of the plurality of sensors operate as acoustic sensors.

18. The electronic device of claim 1, wherein the multi-function acoustic sensor further comprises at least one atmospheric pressure adjusting hole which does not transmit sound pressure to a side wall of the case has.

19. The electronic device of claim 1, wherein the electronic device is a mobile phone, a smart phone, tablet, smart table, a notebook computer, a television, a smart television, an internal microphone of an apparatus, an automobile, or an artificial intelligent speaker.

* * * * *